(12) United States Patent
Scigliano et al.

(10) Patent No.: US 12,249,237 B2
(45) Date of Patent: Mar. 11, 2025

(54) AUTOMOTIVE TRAFFIC FLOW CONTROL IN THE ABSENCE OF SMART INFRASTRUCTURE

(71) Applicant: QUALCOMM Incorporated, San Diego, CA (US)

(72) Inventors: Scott Scigliano, Celina, TX (US); James Stephen, Lake Forest, CA (US)

(73) Assignee: QUALCOMM Incorporated, San Diego, CA (US)

( * ) Notice: Subject to any disclaimer, the term of this patent is extended or adjusted under 35 U.S.C. 154(b) by 257 days.

(21) Appl. No.: 18/150,947

(22) Filed: Jan. 6, 2023

(65) Prior Publication Data
US 2024/0233521 A1    Jul. 11, 2024

(51) Int. Cl.
*G08G 1/01*    (2006.01)
*B60W 30/18*    (2012.01)
(Continued)

(52) U.S. Cl.
CPC .......... *G08G 1/0145* (2013.01); *B60W 30/18* (2013.01); *G08G 1/0112* (2013.01);
(Continued)

(58) Field of Classification Search
CPC .......... B60W 30/18; B60W 2555/00; G05D 1/0061; G05D 1/0088; G05D 1/021; G05D 1/0214; G05D 1/0221; G05D 1/0223; G08G 1/0112; G08G 1/0116; G08G 1/0145; G08G 1/093; G08G 1/09623; G08G 1/09626; G08G 1/096725; G08G 1/096783
See application file for complete search history.

(56) References Cited

U.S. PATENT DOCUMENTS

| 2019/0359214 A1 | 11/2019 | Max et al. |
| 2021/0201669 A1 | 7/2021 | Mitra et al. |

(Continued)

FOREIGN PATENT DOCUMENTS

| CN | 106781551 A | 5/2017 |
| CN | 108320535 B | 10/2020 |

(Continued)

OTHER PUBLICATIONS

International Search Report and Written Opinion—PCT/US2023/078003—ISA/EPO—Mar. 11, 2024.

*Primary Examiner* — Hung Q Nguyen
*Assistant Examiner* — Mark L. Greene
(74) *Attorney, Agent, or Firm* — QUALCOMM Incorporated

(57) ABSTRACT

Disclosed are techniques for traffic flow control. In an aspect, an on-board computer (OBC) of a vehicle of a secondary traffic flow determines that a primary traffic flow is passing through an intersection associated with a traffic light, wherein the determination that the primary traffic flow is passing through the intersection is based on sensor data from one or more sensors of the vehicle, vehicle-to-vehicle (V2V) communication, vehicle-to-everything (V2X) communication, or any combination thereof, and reduces a speed of the vehicle to prevent the vehicle from tripping a traffic light sensor associated with the traffic light until after the primary traffic flow has passed through the intersection.

20 Claims, 7 Drawing Sheets

(51) Int. Cl.
  *G08G 1/09*    (2006.01)
  *G08G 1/0962*    (2006.01)
  *G08G 1/0967*    (2006.01)
(52) U.S. Cl.
  CPC ........... *G08G 1/0116* (2013.01); *G08G 1/093* (2013.01); *G08G 1/09623* (2013.01); *G08G 1/09626* (2013.01); *G08G 1/096725* (2013.01); *G08G 1/096783* (2013.01); *B60W 2555/00* (2020.02)

(56)    References Cited

U.S. PATENT DOCUMENTS

| | | |
|---|---|---|
| 2022/0144273 A1 | 5/2022 | Yamaguchi et al. |
| 2022/0176972 A1 | 6/2022 | Miller et al. |
| 2023/0343213 A1* | 10/2023 | Lauzière ................ G08G 1/095 |

FOREIGN PATENT DOCUMENTS

| | | |
|---|---|---|
| CN | 115116238 A | 9/2022 |
| DE | 102014203983 A1 | 9/2015 |
| DE | 102020007229 A1 * | 5/2022 |
| JP | 2020166746 A | 10/2020 |

\* cited by examiner

AUTOMOTIVE TRAFFIC FLOW CONTROL IN THE ABSENCE OF SMART INFRASTRUCTURE

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (R S-P), such as downlink, uplink, or sidelink positioning reference signals (PRS)) and other technical enhancements.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of traffic flow control performed by an on-board computer (OBC) of a vehicle of a secondary traffic flow includes determining that a primary traffic flow is passing through an intersection associated with a traffic light, wherein the determination that the primary traffic flow is passing through the intersection is based on sensor data from one or more sensors of the vehicle, vehicle-to-vehicle (V2V) communication, vehicle-to-everything (V2X) communication, or any combination thereof; and reducing a speed of the vehicle to prevent the vehicle from tripping a traffic light sensor associated with the traffic light until after the primary traffic flow has passed through the intersection.

In an aspect, an on-board computer (OBC) of a vehicle of a secondary traffic flow includes a memory; at least one transceiver; and at least one processor communicatively coupled to the memory and the at least one transceiver, the at least one processor configured to: determine that a primary traffic flow is passing through an intersection associated with a traffic light, wherein the determination that the primary traffic flow is passing through the intersection is based on sensor data from one or more sensors of the vehicle, vehicle-to-vehicle (V2V) communication, vehicle-to-everything (V2X) communication, or any combination thereof; and reduce a speed of the vehicle to prevent the vehicle from tripping a traffic light sensor associated with the traffic light until after the primary traffic flow has passed through the intersection.

In an aspect, an on-board computer (OBC) of a vehicle of a secondary traffic flow includes means for determining that a primary traffic flow is passing through an intersection associated with a traffic light, wherein the determination that the primary traffic flow is passing through the intersection is based on sensor data from one or more sensors of the vehicle, vehicle-to-vehicle (V2V) communication, vehicle-to-everything (V2X) communication, or any combination thereof; and means for reducing a speed of the vehicle to prevent the vehicle from tripping a traffic light sensor associated with the traffic light until after the primary traffic flow has passed through the intersection.

In an aspect, a non-transitory computer-readable medium storing computer-executable instructions that, when executed by an on-board computer (OBC) of a vehicle of a secondary traffic flow, cause the OBC to: determine that a primary traffic flow is passing through an intersection associated with a traffic light, wherein the determination that the primary traffic flow is passing through the intersection is based on sensor data from one or more sensors of the vehicle, vehicle-to-vehicle (V2V) communication, vehicle-to-everything (V2X) communication, or any combination thereof; and reduce a speed of the vehicle to prevent the vehicle from tripping a traffic light sensor associated with the traffic light until after the primary traffic flow has passed through the intersection.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
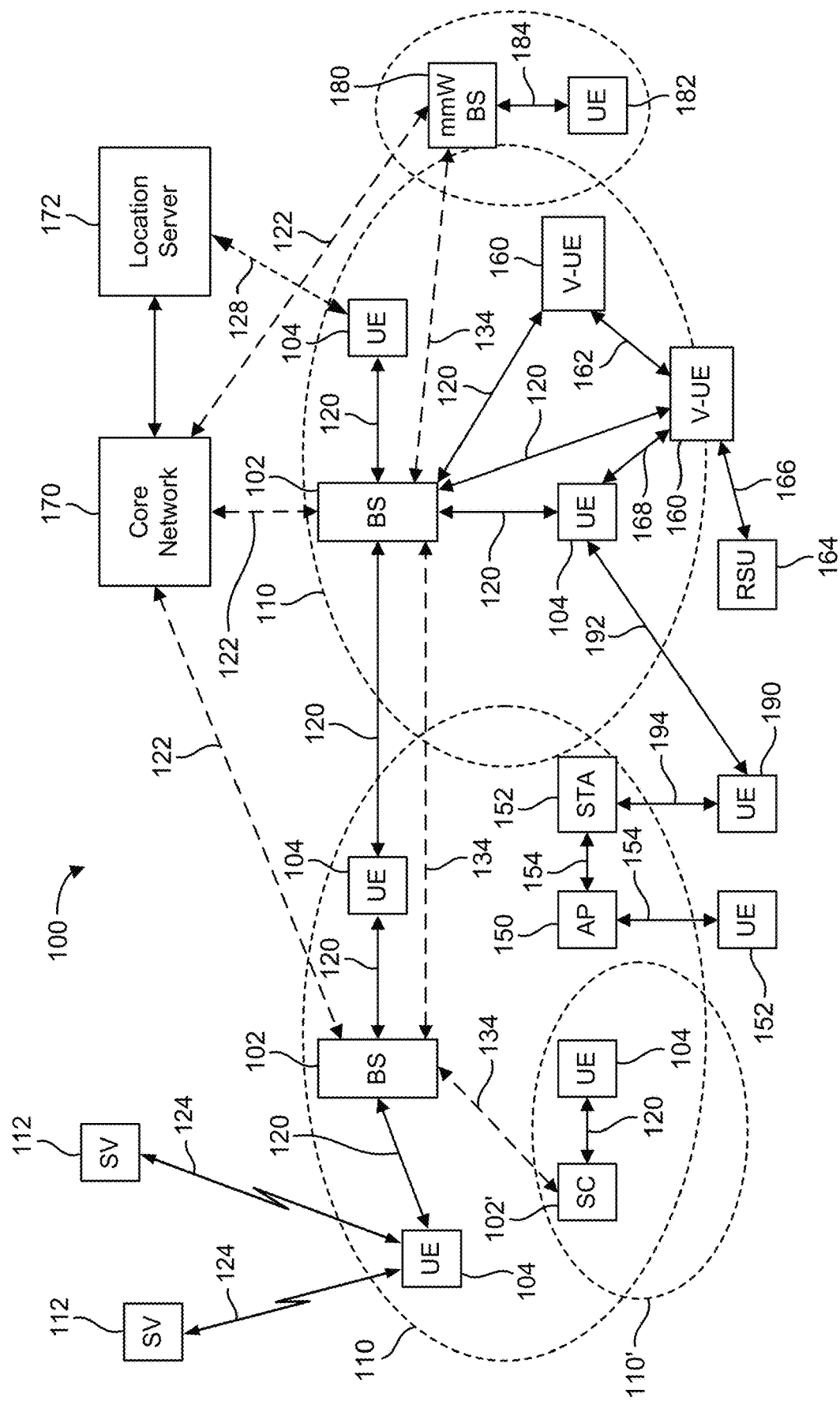
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (V-UE), "pedestrian UE" (P-UE), and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station," or variations thereof.

A V-UE is a type of UE and may be any in-vehicle wireless communication device, such as a navigation system, a warning system, a heads-up display (HUD), an on-board computer, an in-vehicle infotainment system, an automated driving system (ADS), an advanced driver assistance system (ADAS), etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. A P-UE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz- 7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

Leveraging the increased data rates and decreased latency of NR, among other things, vehicle-to-everything (V2X) communication technologies are being implemented to support intelligent transportation systems (ITS) applications, such as wireless communications between vehicles (vehicleto-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 using the Uu interface (i.e., the air interface between a UE and a base station). V-UEs 160 may also communicate directly with each other over a wireless sidelink 162, with a roadside unit (RSU) 164 (a roadside access point) over a wireless sidelink 166, or with sidelink-capable UEs 104 over a wireless sidelink 168 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS G5A band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more RSUs 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more RSUs 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards RSUs 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
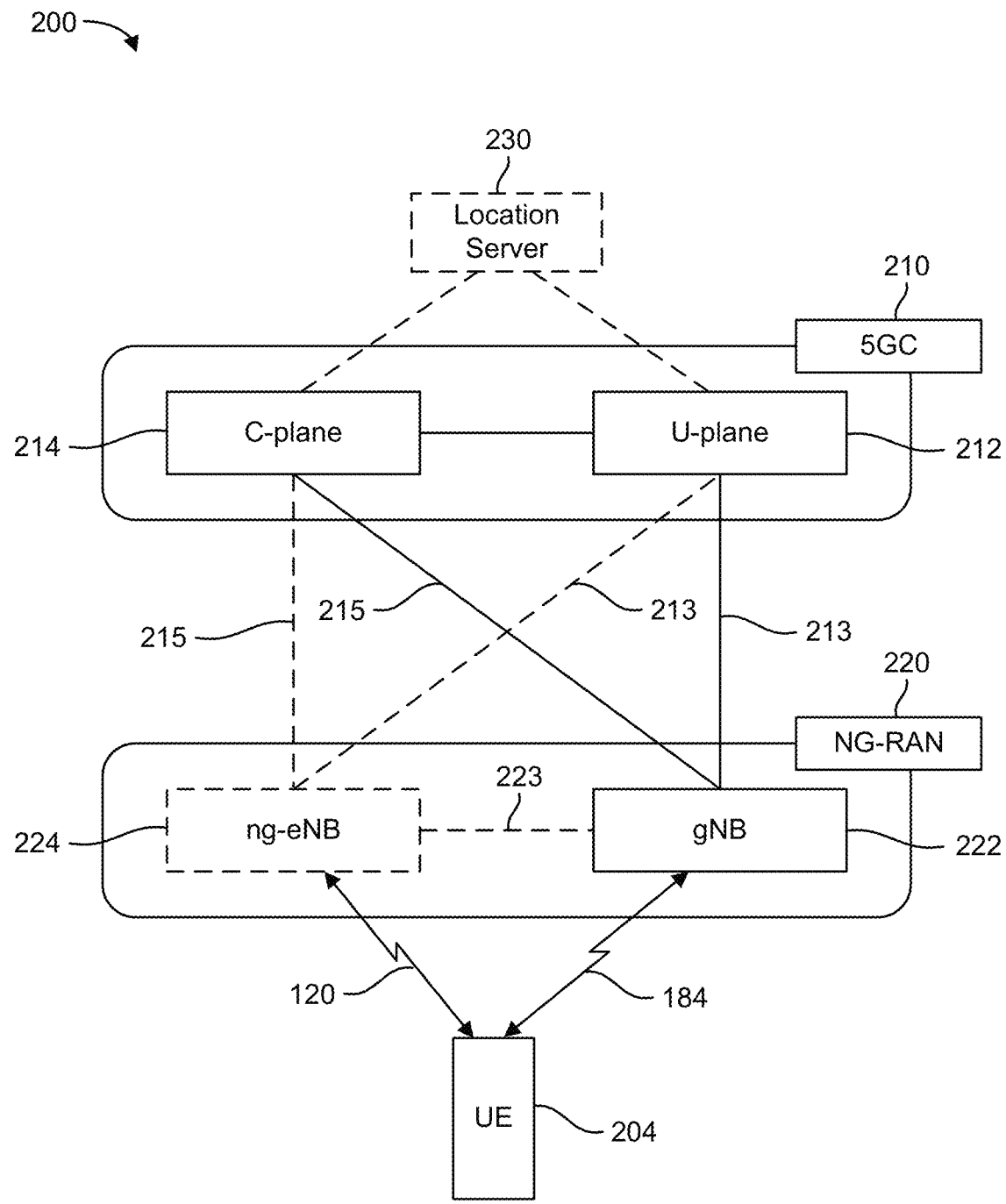
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
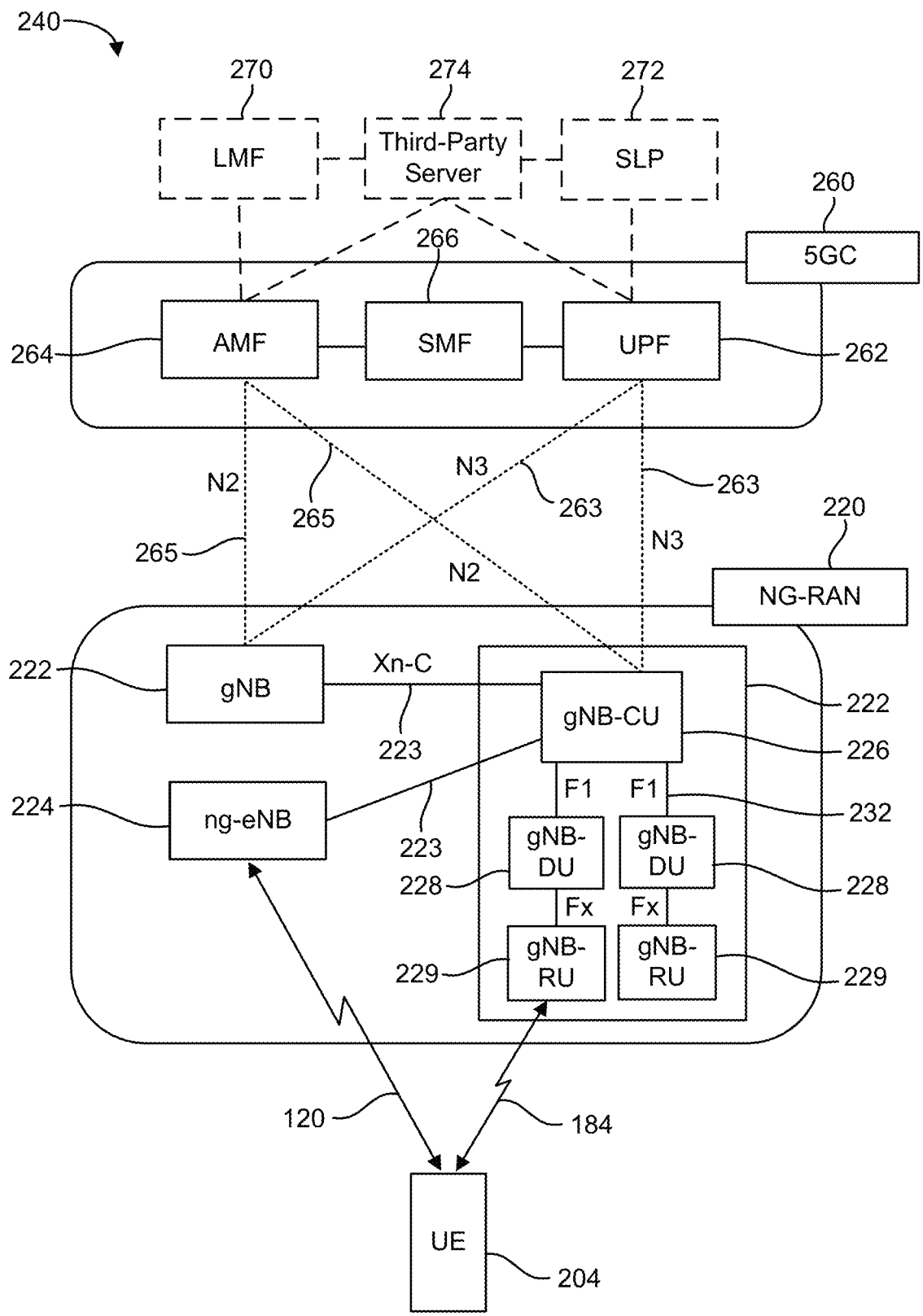

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Autonomous and semi-autonomous driving safety technologies use a combination of hardware (sensors, cameras, and radar) and software to help vehicles identify certain safety risks so they can warn the driver to act (in the case of an ADAS), or act themselves (in the case of an ADS), to avoid a crash. A vehicle outfitted with an ADAS or ADS includes one or more camera sensors mounted on the vehicle that capture images of the scene in front of the vehicle, and also possibly behind and to the sides of the vehicle. Radar systems may also be used to detect objects along the road of travel, and also possibly behind and to the sides of the vehicle. Radar systems utilize RF waves to determine the range, direction, speed, and/or altitude of the objects along the road. More specifically, a transmitter transmits pulses of RF waves that bounce off any object(s) in their path. The pulses reflected off the object(s) return a small part of the RF waves' energy to a receiver, which is typically located at the same location as the transmitter. The camera and radar are typically oriented to capture their respective versions of the same scene.

A processor, such as a digital signal processor (DSP), within the vehicle analyzes the captured camera images and radar frames and attempts to identify objects within the captured scene. Such objects may be other vehicles, pedestrians, road signs, objects within the road of travel, etc. The radar system provides reasonably accurate measurements of object distance and velocity in various weather conditions. However, radar systems typically have insufficient resolution to identify features of the detected objects. Camera sensors, however, typically do provide sufficient resolution to identify object features. The cues of object shapes and appearances extracted from the captured images may provide sufficient characteristics for classification of different objects. Given the complementary properties of the two sensors, data from the two sensors can be combined (referred to as "fusion") in a single system for improved performance.

Modern motor vehicles are increasingly incorporating technology that helps drivers avoid drifting into adjacent lanes or making unsafe lane changes (e.g., lane departure warning (LDW)), or that warns drivers of other vehicles behind them when they are backing up, or that brakes automatically if a vehicle ahead of them stops or slows suddenly (e.g., forward collision warning (FCW)), among other things. The continuing evolution of automotive technology aims to deliver even greater safety benefits, and ultimately deliver automated driving systems (ADS) that can handle the entire task of driving without the need for user intervention.

There are six levels that have been defined to achieve full automation. At Level 0, the human driver does all the driving. At Level 1, an advanced driver assistance system (ADAS) on the vehicle can sometimes assist the human driver with either steering or braking/accelerating, but not both simultaneously. At Level 2, an ADAS on the vehicle can itself actually control both steering and braking/accelerating simultaneously under some circumstances. The human driver must continue to pay full attention at all times and perform the remainder of the driving tasks. At Level 3, an ADS on the vehicle can itself perform all aspects of the driving task under some circumstances. In those circumstances, the human driver must be ready to take back control at any time when the ADS requests the human driver to do so. In all other circumstances, the human driver performs the driving task. At Level 4, an ADS on the vehicle can itself perform all driving tasks and monitor the driving environment, essentially doing all of the driving, in certain circumstances. The human need not pay attention in those circumstances. At Level 5, an ADS on the vehicle can do all the driving in all circumstances. The human occupants are just passengers and need never be involved in driving.

To further enhance ADAS and ADS systems, especially at Level 3 and beyond, autonomous and semi-autonomous vehicles may utilize high definition (HD) map datasets, which contain significantly more detailed information and true-ground-absolute accuracy than those found in current conventional resources. Such HD maps may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by autonomous/semi-autonomous vehicles. HD maps may also provide electronic horizon predictive awareness, which enables autonomous/semi-autonomous vehicles to know what lies ahead.

Note that an autonomous or semi-autonomous vehicle may be, but need not be, a V-UE. Likewise, a V-UE may be, but need not be, an autonomous or semi-autonomous vehicle. An autonomous or semi-autonomous vehicle is a vehicle outfitted with an ADAS or ADS. A V-UE is a vehicle with cellular connectivity to a 5G or other cellular network. An autonomous or semi-autonomous vehicle that uses, or is capable of using, cellular techniques for positioning and/or navigation is a V-UE.

Figure 3:
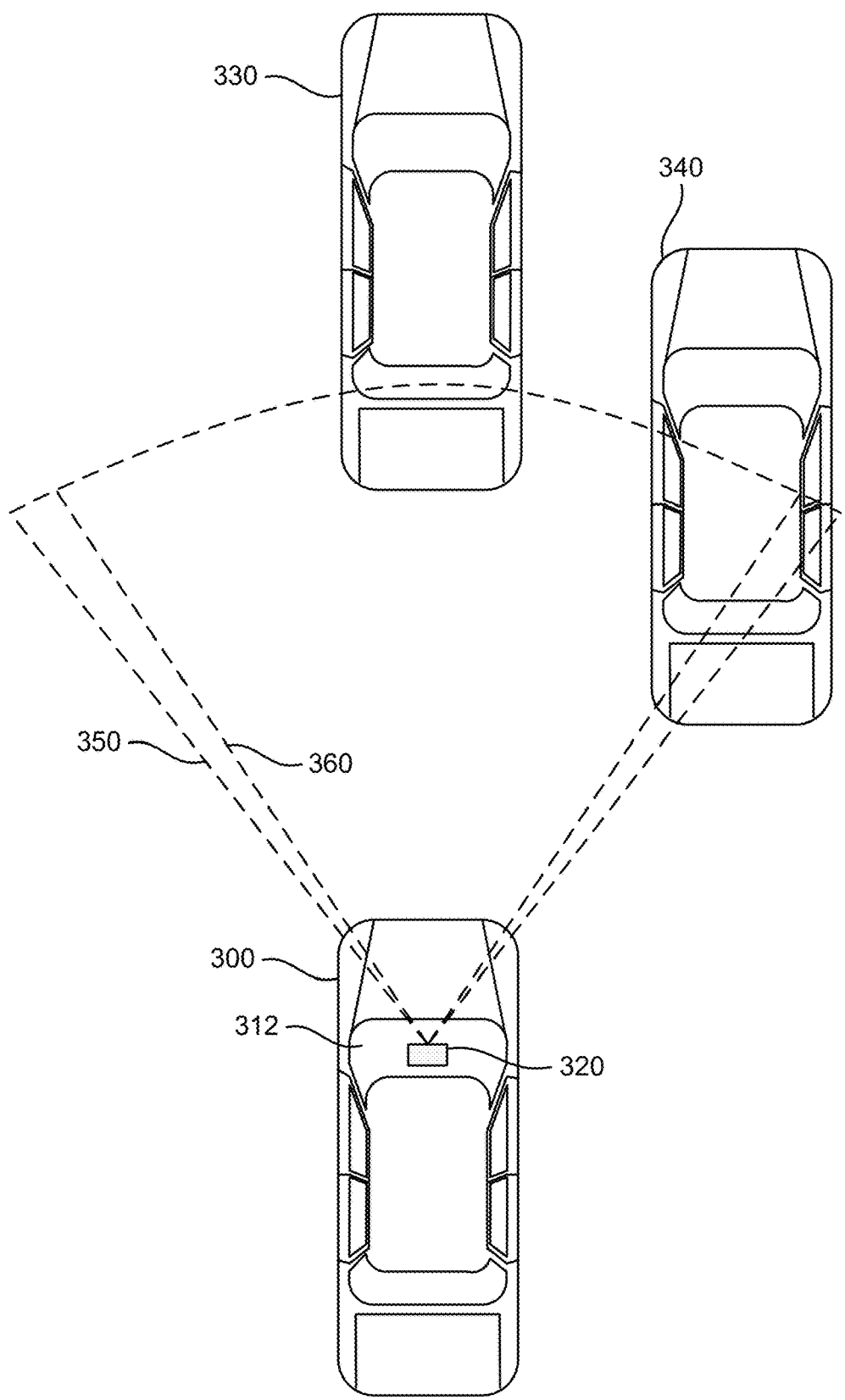
FIG. 3 is a top view of a vehicle employing an integrated radar-camera sensor behind the windshield, according to various aspects of the disclosure.

Referring now to FIG. 3, a vehicle 300 (referred to as an "ego vehicle" or a "host vehicle") is illustrated that includes a radar-camera sensor module 320 located in the interior compartment of the vehicle 300 behind the windshield 312. The radar-camera sensor module 320 includes a radar component configured to transmit radar signals through the windshield 312 in a horizontal coverage zone 350 (shown by dashed lines), and receive reflected radar signals that are reflected off of any objects within the coverage zone 350. The radar-camera sensor module 320 further includes a camera component for capturing images based on light waves that are seen and captured through the windshield 312 in a horizontal coverage zone 360 (shown by dashed lines).

Although FIG. 3 illustrates an example in which the radar component and the camera component are co-located components in a shared housing, as will be appreciated, they may be separately housed in different locations within the vehicle 300. For example, the camera may be located as shown in FIG. 3, and the radar component may be located in the grill or front bumper of the vehicle 300. Additionally, although FIG. 3 illustrates the radar-camera sensor module 320 located behind the windshield 312, it may instead be located in a rooftop sensor array, or elsewhere. Further, although FIG. 3 illustrates only a single radar-camera sensor module 320, as will be appreciated, the vehicle 300 may have multiple radar-camera sensor modules 320 pointed in different directions (to the sides, the front, the rear, etc.). The various radar-camera sensor modules 320 may be under the "skin" of the vehicle (e.g., behind the windshield 312, door panels, bumpers, grills, etc.) or within a rooftop sensor array.

The radar-camera sensor module 320 may detect one or more (or none) objects relative to the vehicle 300. In the example of FIG. 3, there are two objects, vehicles 330 and 340, within the horizontal coverage zones 350 and 360 that the radar-camera sensor module 320 can detect. The radar-camera sensor module 320 may estimate parameters (attributes) of the detected object(s), such as the position, range, direction, speed, size, classification (e.g., vehicle, pedestrian, road sign, etc.), and the like. The radar-camera sensor module 320 may be employed onboard the vehicle 300 for automotive safety applications, such as adaptive cruise control (ACC), forward collision warning (FCW), collision mitigation or avoidance via autonomous braking, lane departure warning (LDW), and the like.

Figure 4:
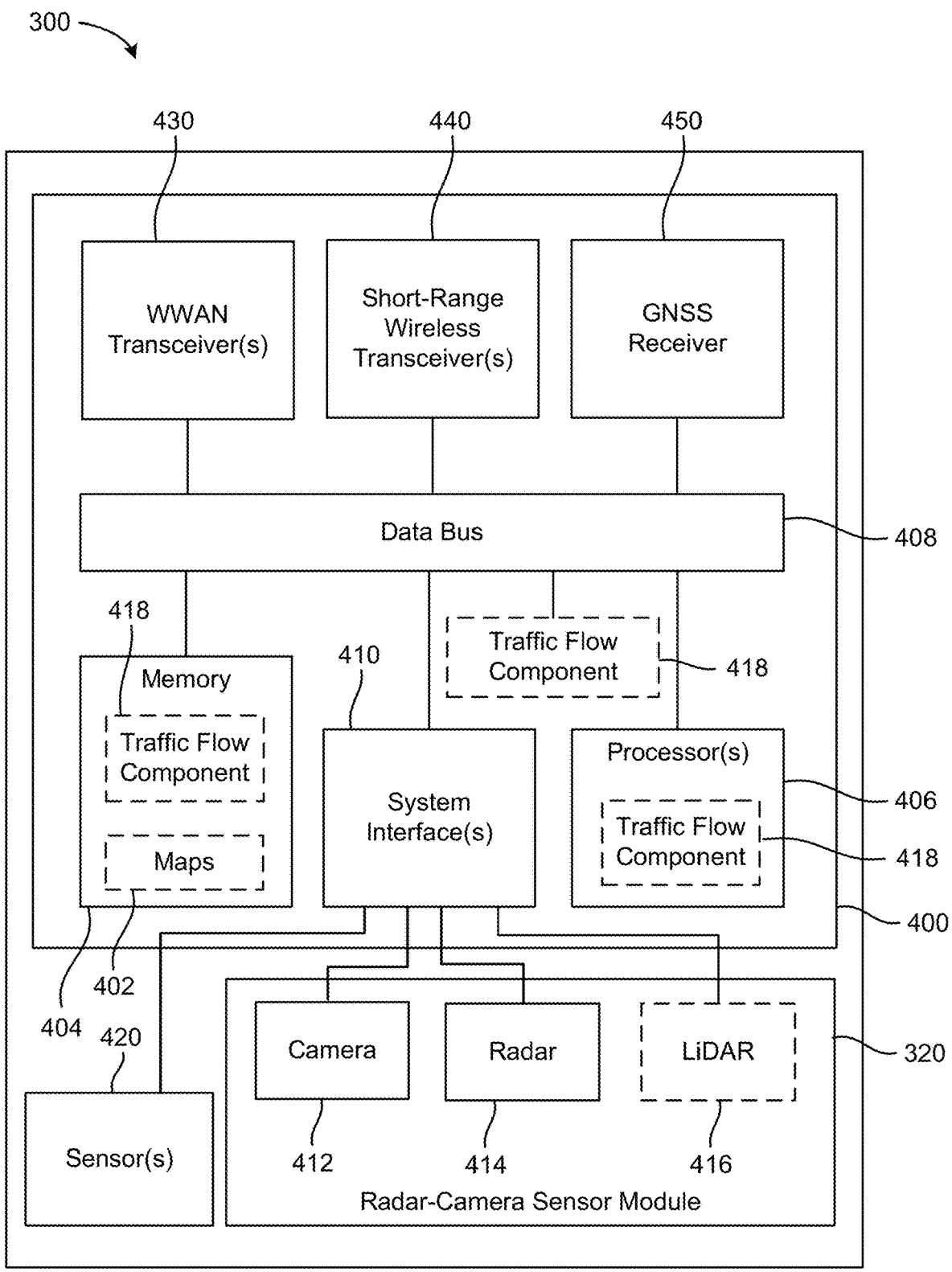
FIG. 4 illustrates an example user equipment (UE) architecture, according to various aspects of the disclosure.

Collocating the camera and radar permits these components to share electronics and signal processing, and in particular, enables early radar-camera data fusion. For example, the radar and camera may be integrated onto a single board. A joint radar-camera alignment technique may be employed to align both the radar and the camera. However, collocation of the radar and camera is not required to practice the techniques described herein. FIG. 4 illustrates an on-board computer (OBC) 400 of a vehicle 300, according to various aspects of the disclosure. In an aspect, the OBC 400 may be part of an ADAS or ADS. The OBC 400 may also be the V-UE of the vehicle 300. The OBC 400 includes a non-transitory computer-readable storage medium, i.e., memory 404, and one or more processors 406 in communication with the memory 404 via a data bus 408. The memory 404 includes one or more storage modules storing computer-readable instructions executable by the one or more processors 406 to perform the functions of the OBC 400 described herein. For example, the one or more processors 406 in conjunction with the memory 404 may implement the various operations described herein.

One or more radar-camera sensor modules 320 are coupled to the OBC 400 (only one is shown in FIG. 4 for simplicity). In some aspects, the radar-camera sensor module 320 includes at least one camera 412, at least one radar 414, and an optional light detection and ranging (lidar) sensor 416. The OBC 400 also includes one or more system interfaces 410 connecting the one or more processors 406, by way of the data bus 408, to the radar-camera sensor module 320 and, optionally, other vehicle sub-systems (not shown).

The OBC 400 also includes, at least in some cases, one or more wireless wide area network (WWAN) transceivers 430 configured to communicate via one or more wireless communication networks (not shown), such as an NR network, an LTE network, a Global System for Mobile communication (GSM) network, and/or the like. The one or more WWAN transceivers 430 may be connected to one or more antennas (not shown) for communicating with other network nodes, such as other V-UEs, pedestrian UEs, infrastructure access points, roadside units (RSUs), base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The one or more WWAN transceivers 430 may be variously configured for transmitting and encoding signals (e.g., messages, indications, information, and so on), and, conversely, for receiving and decoding signals (e.g., messages, indications, information, pilots, and so on) in accordance with the designated RAT.

The OBC 400 also includes, at least in some cases, one or more short-range wireless transceivers 440 (e.g., a Wi-Fi transceiver, a Bluetooth transceiver, etc.). The one or more short-range wireless transceivers 440 may be connected to one or more antennas (not shown) for communicating with other network nodes, such as other V-UEs, pedestrian UEs, infrastructure access points, RSUs, etc., via at least one designated RAT (e.g., cellular vehicle-to-everything (C-V2X), IEEE 802.11p (also known as wireless access for vehicular environments (WAVE)), dedicated short-range communication (DSRC), etc.) over a wireless communication medium of interest. The one or more short-range wireless transceivers 440 may be variously configured for transmitting and encoding signals (e.g., messages, indications, information, and so on), and, conversely, for receiving and decoding signals (e.g., messages, indications, information, pilots, and so on) in accordance with the designated RAT.

As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a receiver chip or similar circuitry simply providing low-level sniffing).

The OBC 400 also includes, at least in some cases, a global navigation satellite system (GNSS) receiver 450. The GNSS receiver 450 may be connected to one or more antennas (not shown) for receiving satellite signals. The GNSS receiver 450 may comprise any suitable hardware and/or software for receiving and processing GNSS signals. The GNSS receiver 450 requests information and operations as appropriate from the other systems, and performs the calculations necessary to determine the vehicle's 300 position using measurements obtained by any suitable GNSS algorithm.

In an aspect, the OBC 400 may utilize the one or more WWAN transceivers 430 and/or the one or more short-range wireless transceivers 440 to download one or more maps 402 that can then be stored in memory 404 and used for vehicle navigation. Map(s) 402 may be one or more high definition (HD) maps, which may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by vehicle 300. Map(s) 402 may also provide electronic horizon predictive awareness, which enables the vehicle 300 to know what lies ahead.

The vehicle 300 may include one or more sensors 420 that may be coupled to the one or more processors 406 via the one or more system interfaces 410. The one or more sensors 420 may provide means for sensing or detecting information related to the state and/or environment of the vehicle 300, such as speed, heading (e.g., compass heading), headlight status, gas mileage, etc. By way of example, the one or more sensors 420 may include an odometer a speedometer, a tachometer, an accelerometer (e.g., a micro-electromechanical system-s (MEMS) device), a gyroscope, a geomagnetic sensor (e.g., a compass), an altimeter (e.g., a barometric pressure altimeter), etc. Although shown as located outside the OBC 400, some of these sensors 420 may be located on the OBC 400 and some may be located elsewhere in the vehicle 300.

The OBC 400 may further include a traffic flow component 418. The traffic flow component 418 may be a hardware circuit that is part of or coupled to the one or more processors 406 that, when executed, causes the OBC 400 to perform the functionality described herein. In other aspects, the traffic flow component 418 may be external to the one or more processors 406 (e.g., part of a positioning processing system, integrated with another processing system, etc.). Alternatively, the traffic flow component 418 may be one or more memory modules stored in the memory 404 that, when executed by the one or more processors 406 (or positioning processing system, another processing system, etc.), cause the OBC 400 to perform the functionality described herein. As a specific example, the traffic flow component 418 may comprise a plurality of positioning engines, a positioning engine aggregator, a sensor fusion module, and/or the like. FIG. 4 illustrates possible locations of the traffic flow component 418, which may be, for example, part of the memory 404, the one or more processors 406, or any combination thereof, or may be a standalone component.

In an aspect, the camera 412 may capture image frames (also referred to herein as camera frames) of the scene within the viewing area of the camera 412 (as illustrated in FIG. 3 as horizontal coverage zone 360) at some periodic rate. Likewise, the radar 414 may capture radar frames of the scene within the viewing area of the radar 414 (as illustrated in FIG. 3 as horizontal coverage zone 350) at some periodic rate. The periodic rates at which the camera 412 and the radar 414 capture their respective frames may be the same or different. Each camera and radar frame may be time-stamped. Thus, where the periodic rates are different, the timestamps can be used to select simultaneously, or nearly simultaneously, captured camera and radar frames for further processing (e.g., fusion).

For convenience, the OBC 400 is shown in FIG. 4 as including various components that may be configured according to the various examples described herein. It will be appreciated, however, that the illustrated components may have different functionality in different designs. In particular, various components in FIG. 4 are optional in alternative configurations and the various aspects include configurations that may vary due to design choice, costs, use of the device, or other considerations. For brevity, illustration of the various alternative configurations is not provided herein, but would be readily understandable to one skilled in the art.

The components of FIG. 4 maybe implemented in various ways. In some implementations, the components of FIG. 4 maybe implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 402 to 450 may be implemented by processor and memory component(s) of the UE 400 (e.g., by execution of appropriate code and/or by appropriate configuration of processor components). For simplicity, various operations, acts, and/or functions are described herein as being performed "by a UE," "by an OBC," or "by a vehicle." However, as will be appreciated, such operations, acts, and/or functions may actually be performed by specific components or combinations of components of the OBC 400, such as the one or more processors 406, the one or more transceivers 430 and 440, the memory 404, the traffic flow component 418, etc.

One of the main benefits for automated or self-driving vehicles is the opportunity to optimize traffic flow. A very common problem for traffic flow is traffic light synchronization. For example, a common scenario is where a large number of vehicles traveling along a roadway in one direction (referred to as a "primary traffic flow" or "superior traffic flow") are stopped at a traffic light to allow a single vehicle, or a much smaller number of vehicles (referred to as a "secondary traffic flow" or "inferior traffic flow"), to cross the roadway in a different direction. As would be appreciated, holding up an entire line of traffic at a stop light to allow one or two vehicles to cross in front of them is inefficient in terms of traffic flow.

One solution is to install "smart" roadside infrastructure (e.g., traffic lights) and enable the vehicles to communicate with this infrastructure (e.g., via V2I protocols). The infrastructure would then be responsible for optimizing the traffic flow. For example, referring to the intersection example above, the infrastructure may wait for a break in the primary traffic flow to allow the single vehicle to cross the intersection. However, such an approach would likely be costly and slow to implement at every intersection along a road.

Accordingly, in the absence of smart infrastructure, the present disclosure provides techniques to enable vehicles in the primary and secondary traffic flows to communicate with each other (e.g., via V2V protocols) to determine traffic flow patterns. Referring to the intersection example, one or more vehicles of the primary traffic flow can determine that they are approaching an intersection and inform any vehicles in the secondary traffic flow to wait at the traffic light until they have passed. However, if the vehicle(s) in the secondary traffic flow are allowed to freely arrive at the intersection, they will inevitably trip the traffic light sensor and cause the traffic light to switch, stopping the primary traffic flow.

To address this issue, at least the lead vehicle in the secondary traffic flow can determine where along the road the traffic light sensor is and stop short of the sensor to avoid tripping the traffic light. When allowed to proceed through the intersection (e.g., due to a break in the primary traffic flow or after some threshold period of time), the lead vehicle can move forward and trip the traffic light at the correct time to avoid stopping any other traffic. Alternatively, when possible, rather than come to a full stop before the traffic light sensor, the lead vehicle of the secondary traffic flow may slow down far enough in advance of the sensor that it does not trip the sensor until the appropriate time. This option may be more fuel efficient, as well as safer, as the vehicle would not be stopping down the road from a traffic light.

Figure 5:
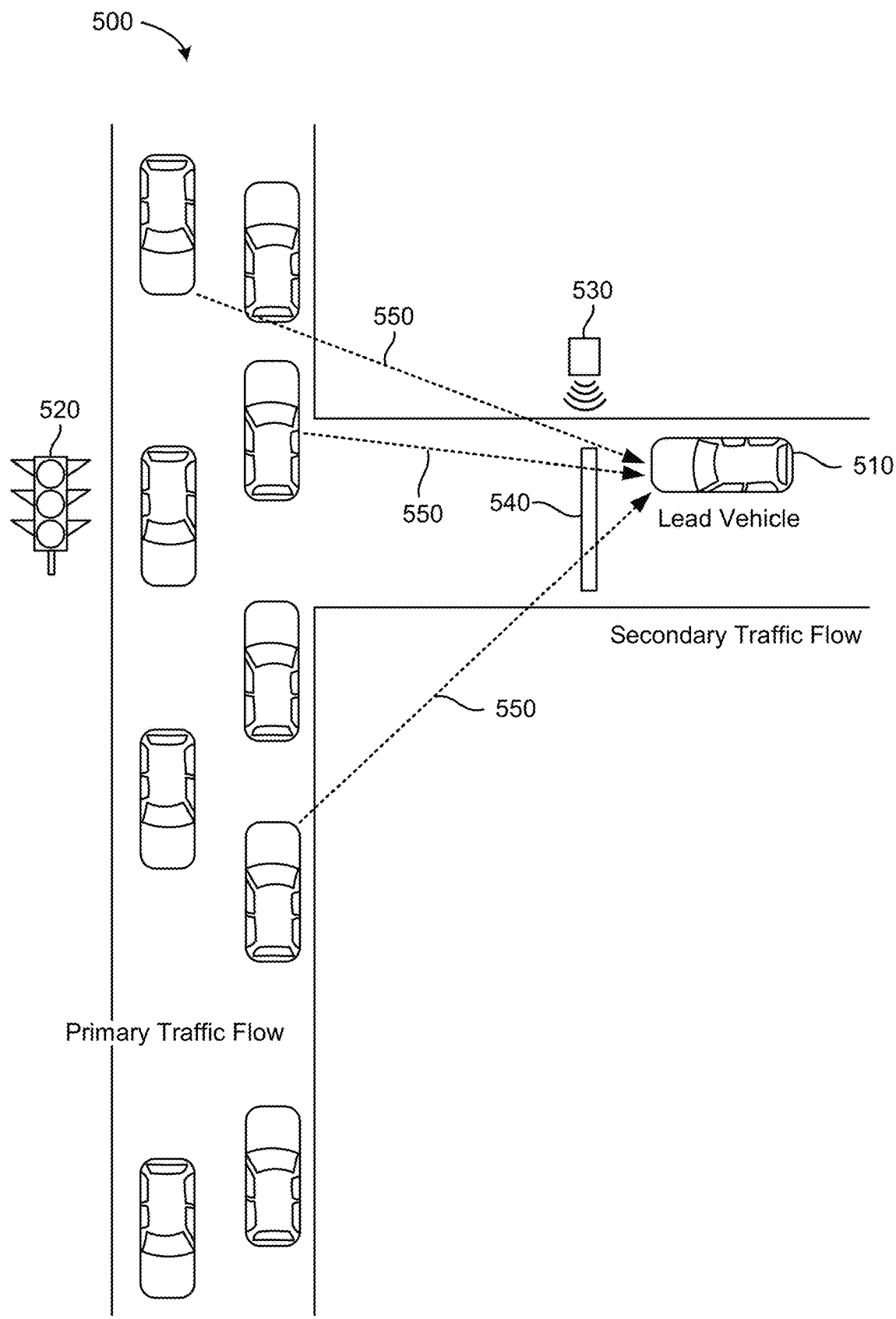
FIG. 5 is a diagram illustrating an example intersection having a primary traffic flow and a secondary traffic flow, according to aspects of the disclosure.

FIG. 5 is a diagram 500 illustrating an example intersection having a primary traffic flow and a secondary traffic flow, according to aspects of the disclosure. As shown in FIG. 5, a lead vehicle 510 of a secondary traffic flow is approaching a "T" intersection with a primary traffic flow. A traffic light 520 at the intersection may be triggered to change from red to green for the secondary traffic flow based on a traffic light sensor 530 being tripped (e.g., by the lead vehicle 510).

The lead vehicle 510 of the secondary traffic flow may determine the location of the traffic light sensor 530 based on cameras (e.g., camera 412), radar (e.g., radar 414), lidar (e.g., lidar sensor 416), GPS (i.e., GPS coordinates of the sensor), machine learning algorithms (to determine whether a detected object is a traffic light sensor), public database(s) of sensor locations, HD map data (e.g., maps 402), which may include the sensor locations, or any combination thereof. As more and more vehicles implement the techniques disclosed herein, a public database can be used to enhance the accuracy of detecting sensors at any given traffic light.

In some cases, the location of the traffic light sensor 530 may be indicated by various visual means, such as by a line painted on the road or a sign at the location of the traffic light sensor 530 or indicating the point at which the traffic light sensor 530 will be tripped. In the example of FIG. 5, a painted stripe 540 on the roadway of the secondary traffic flow indicates the location of the traffic light sensor 530, and thereby, the location at which the traffic light sensor 530 will be tripped and the traffic light 520 will be triggered to change. In some cases, the lead vehicle 510 may be able to detect the traffic light sensor itself. The lead vehicle 510 may perform object detection based on captured camera/radar/lidar data to detect these visual indications of the location of the traffic light sensor, possibly also using machine learning algorithms.

The lead vehicle 510 may also determine that it is the lead vehicle 510 of the secondary traffic flow using one or more of the same sensors. For example, the lead vehicle 510 may determine from cameras, radar, and/or lidar that there are no other vehicles between it and the intersection, and may determine from map data that it is on a secondary road to the primary road. Alternatively, the lead vehicle 510 may determine that it is in the secondary traffic flow from the cameras, radar, and/or lidar, insofar as the data from those sensors may indicate a large number of vehicles traveling perpendicular (or some other non-parallel direction) to the lead vehicle 510.

The lead vehicle 510 may also determine that it is part of a secondary traffic flow based on notifications received from one or more vehicles in the primary traffic flow. For example, one or more of the vehicles in the primary traffic flow may transmit a notification to the lead vehicle 510. The notification may indicate that the vehicle is part of a group of vehicles approaching or passing through the intersection, and the lead vehicle 510 should wait for them to pass. In the example of FIG. 5, three vehicles in the primary traffic flow are transmitting notifications 550 to the lead vehicle 510 in the secondary traffic flow. These notifications may be transmitted and received via a V2V protocol.

The vehicles in the primary traffic flow (referred to as "primary vehicles," "superior vehicles," or the like) may determine that they are part of the primary traffic flow in various ways. For example, the vehicles may communicate their locations, travel directions, speed, etc. with each other and determine that they are going in the same direction at the same speed (or within a threshold of the same speed) within a certain proximity of each other. As another example, especially where not all of the vehicles in the primary traffic flow are capable of V2V communication, at least some of the vehicles in the primary traffic flow may use sensors (e.g., cameras, radar, lidar) to detect the number, direction, and speed of the vehicles around them. If enough other vehicles (i.e., above some threshold) going the same direction at the same speed are detected, the primary vehicle may determine that it is part of a primary traffic flow. As will be appreciated, there are other ways for the vehicles in a primary traffic flow to determine that they are in a sufficiently sized group that they should not be stopped at an intersection by a single vehicle on a secondary road.

As briefly noted above, and as will be appreciated, not all vehicles in the primary traffic flow need to be capable of V2V communication and/or equipped with sensors that can detect the presence of other vehicles (e.g., cameras, radar, lidar). It is sufficient that some of them are, as the ones that are can detect other vehicles that are not capable of V2V communication and/or do not have the necessary sensors.

Further, while FIG. 5 illustrates a "T" intersection where both directions of the primary traffic flow are moving through the intersection at the same time, as will be appreciated, this is merely an example, and the intersection may be more complex, to the point that only one direction of traffic may be permitted through the intersection at a time. In that case, the priority through the intersection may be based on the size of the traffic flows, with the largest traffic flow (i.e., the largest group of vehicles going the same direction at relatively the same speed within close enough proximity to each other) having the highest priority and the smallest traffic flow (i.e., the smallest group of vehicles going the same direction at relatively the same speed within close enough proximity to each other) having the lowest priority.

In some cases, the primary traffic flow may have fewer vehicles than the secondary traffic flow, but one or more vehicles in the primary traffic flow may have higher priority than the vehicles in the secondary traffic flow. For example, a funeral procession, police escort, emergency responder vehicles, etc. may be considered primary traffic flows that have priority over larger secondary traffic flows because of their priority.

Although the lead vehicle 510 of the secondary traffic flow may determine that it is the lead vehicle of a secondary traffic flow and should prevent the traffic light from changing until there is a gap in the primary traffic flow as it passes through the intersection, this determination may be overridden. For example, the driver of the vehicle may prevent the lead vehicle 510 from autonomously stopping or slowing down short of the traffic light sensor 530 (e.g., by taking control of the vehicle) or the lead vehicle 510 may be a high priority vehicle (e.g., an emergency responder vehicle). In this case, the lead vehicle 510 may notify the vehicles in the primary traffic flow that it will not be refraining from triggering the traffic light 520, or simply approach the intersection normally without sending a notification.

Similarly, where there are multiple vehicles in the secondary traffic flow, the lead vehicle 510 may notify the vehicles behind it that it will be stopping or slowing down to prevent the triggering of the traffic light 520. In cases where only some, or none, of the vehicles in the secondary traffic flow following the lead vehicle 510 are capable of V2V communication, the lead vehicle 510 may also or alternatively give some visual indication that it will be stopping or slowing down in advance of the intersection. For example, the lead vehicle 510 may flash its tail lights (e.g., break lights, reverse lights, and/or running lights) in a particular pattern. Where the next vehicle in the secondary traffic flow is equipped with cameras, it may detect the tail light pattern and flash the same pattern to the next vehicle in the secondary traffic flow, and so on. If a V2V-capable vehicle in the secondary traffic flow detects the tail light pattern, it may transmit the notification via V2V signaling and/or via the tail light pattern. Alternatively, rather than provide any signaling, the lead vehicle 510 may simply slow down or stop to prevent the triggering of the traffic light 520.

In some cases, there may be more than one lane of traffic going the same direction in the secondary traffic flow. In that case, the lead vehicles 510 in all of the multiple lanes will need to stop or slow down to prevent triggering the traffic light 520. The multiple lead vehicles 510 may coordinate via V2V signaling and/or pattern of blinking lights. In the latter case, because the lead vehicles 510 may be side by side (versus one leading), the pattern of blinking lights may involve lights on the front (e.g., headlights, fog lights, running lights), back (e.g., break lights, reverse lights, running lights), and/or sides (e.g., side mirror lights, running lights) of the lead vehicles 510. Which lights may depend on the locations relative to each other of the lead vehicles 510 or may involve the same lights regardless of the relative locations of the lead vehicles 510.

In some cases, where there is "smart" infrastructure deployed at the intersection (e.g., the traffic light 520 is capable of V2X communication and is optionally equipped with cameras), which traffic flow is primary and which is secondary may be determined by, or with the assistance of, the infrastructure. For example, the infrastructure may determine the size of the group of vehicles making up the primary traffic flow based on V2X communication with the group members and/or camera/radar/lidar detection of the members of the group. The infrastructure may then inform the members that they are a primary traffic flow, and the members may broadcast notifications to any secondary traffic flow(s). Alternatively, the infrastructure may notify the vehicle(s) in the secondary traffic flow that they should wait for the primary traffic flow to pass before triggering the traffic light 520. As yet another alternative, the infrastructure may simply relay the messages exchanged between the vehicles in the different traffic flows.

The foregoing techniques do not require fully autonomous behavior by the involved vehicles. Rather, the vehicles may be semi-autonomous, at least to Level 2, and may or may not have V2V/V2X capabilities. The number of vehicles in the primary traffic flow necessary to trigger the disclosed behavior of the vehicles in the secondary traffic flow may be standardized or determined by the vehicle manufacturer(s).

Figure 6:
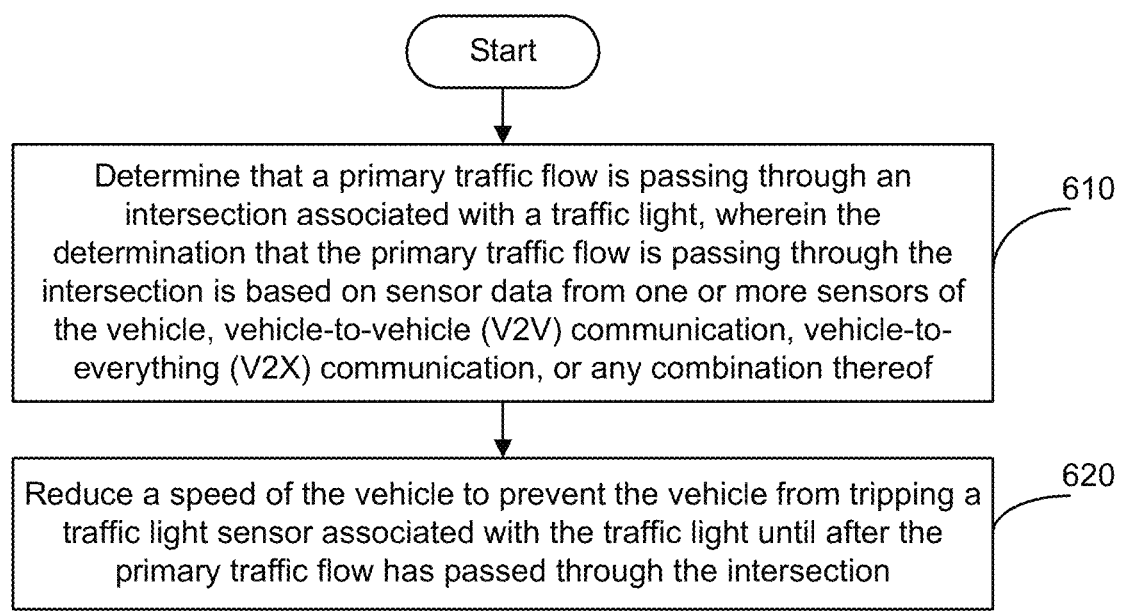
FIG. 6 illustrates an example method of traffic flow control, according to aspects of the disclosure.

FIG. 6 illustrates an example method 600 of traffic flow control, according to aspects of the disclosure. In an aspect, method 600 may be performed by an OBC of a vehicle of a secondary traffic flow (e.g., OBC 400).

At 610, the OBC determines that a primary traffic flow is passing through an intersection associated with a traffic light, wherein the determination that the primary traffic flow is passing through the intersection is based on sensor data from one or more sensors of the vehicle, V2V communication, V2X communication, or any combination thereof. In an aspect, operation 610 may be performed by the one or more WWAN transceivers 430, the one or more short-range wireless transceiver 440, the one or more processors 406, memory 404, and/or traffic flow component 418, any or all of which may be considered means for performing this operation.

At 620, the OBC reduces a speed of the vehicle to prevent the vehicle from tripping a traffic light sensor associated with the traffic light until after the primary traffic flow has passed through the intersection. In an aspect, operation 620 may be performed by the one or more WWAN transceivers 430, the one or more short-range wireless transceiver 440, the one or more processors 406, memory 404, and/or traffic flow component 418, any or all of which may be considered means for performing this operation.

As will be appreciated, a technical advantage of the method 600 is improved traffic flow at intersections with traffic lights.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of traffic flow control performed by an on-board computer (OBC) of a vehicle of a secondary traffic flow, comprising: determining that a primary traffic flow is passing through an intersection associated with a traffic light, wherein the determination that the primary traffic flow is passing through the intersection is based on sensor data from one or more sensors of the vehicle, vehicle-to-vehicle (V2V) communication, vehicle-to-everything (V2X) communication, or any combination thereof; and reducing a speed of the vehicle to prevent the vehicle from tripping a traffic light sensor associated with the traffic light until after the primary traffic flow has passed through the intersection.

Clause 2. The method of clause 1, wherein determining that the primary traffic flow is passing through the intersection comprises: receiving at least one notification from at least one vehicle of the primary traffic flow via V2V communication, the notification indicating that the primary traffic flow is passing through the intersection.

Clause 3. The method of any of clauses 1 to 2, wherein determining that the primary traffic flow is passing through the intersection comprises: receiving at least one notification from roadside infrastructure associated with the intersection via V2X communication, the notification indicating that the primary traffic flow is passing through the intersection.

Clause 4. The method of clause 3, wherein the at least one notification is relayed from at least one vehicle of the primary traffic flow.

Clause 5. The method of any of clauses 1 to 4, wherein determining that the primary traffic flow is passing through the intersection comprises: detecting the primary traffic flow based on the sensor data from the one or more sensors of the vehicle.

Clause 6. The method of any of clauses 1 to 5, wherein the one or more sensors of the vehicle comprise: one or more cameras, radar, lidar, or any combination thereof.

Clause 7. The method of any of clauses 1 to 6, wherein the primary traffic flow is determined to be the primary traffic flow based on: a number of vehicles in the primary traffic flow being greater than a threshold, a priority of at least one vehicle in the primary traffic flow being greater than a priority of the vehicle, or any combination thereof.

Clause 8. The method of any of clauses 1 to 7, wherein reducing the speed of the vehicle comprises: stopping the vehicle before the vehicle reaches the traffic light sensor; or reducing the speed of the vehicle to a reduced speed before the vehicle reaches the traffic light sensor, wherein the reduced speed is selected to prevent the vehicle from stopping and from tripping the traffic light sensor until after the primary traffic flow has passed through the intersection.

Clause 9. The method of any of clauses 1 to 8, wherein a location of the traffic light sensor is determined based on: geographic coordinates of the location of the traffic light sensor, a visual indication of the location of the traffic light sensor, map data indicating the location of the traffic light sensor, a database of locations of traffic light sensors, or any combination thereof.

Clause 10. The method of clause 9, wherein the visual indication of the location of the traffic light sensor comprises: a marking on a surface of road at the location of the traffic light sensor, a sign at the location of the traffic light sensor, the traffic light sensor, or any combination thereof.

Clause 11. The method of any of clauses 1 to 10, further comprising: determining that the vehicle is a lead vehicle of the secondary traffic flow, wherein the determination that the vehicle is the lead vehicle is based on second sensor data from the one or more sensors of the vehicle, V2V communication with one or more other vehicles of the secondary traffic flow, V2X communication with infrastructure associated with the intersection, or any combination thereof.

Clause 12. The method of clause 11, further comprising: determining that a second vehicle is a second lead vehicle of a different lane of the secondary traffic flow; and coordinating with the second vehicle to reduce a speed of the second vehicle to prevent the second vehicle from tripping the traffic light sensor. Clause 13. The method of clause 12, wherein coordinating with the second vehicle comprises: transmitting one or more notifications to the second vehicle via V2V signaling; transmitting the one or more notifications to the second vehicle via roadside infrastructure via V2X signaling; flashing lights of the vehicle according to a pattern; or a combination thereof.

Clause 14. The method of any of clauses 1 to 13, further comprising: signaling any vehicles behind the vehicle that the vehicle is reducing the speed of the vehicle to prevent the vehicle from tripping the traffic light sensor.

Clause 15. The method of clause 14, wherein the signaling comprises: transmitting one or more notifications; flashing lights of the vehicle according to a pattern; or a combination thereof.

Clause 16. The method of any of clauses 1 to 15, further comprising: receiving an override command to stop the vehicle from reducing the speed of the vehicle.

Clause 17. The method of clause 16, wherein: the override command is received from a driver of the vehicle, or the override command is received based on a determination that the vehicle is a high priority vehicle.

Clause 18. An on-board computer (OBC) of a vehicle of a secondary traffic flow, comprising: a memory; at least one transceiver; and at least one processor communicatively coupled to the memory and the at least one transceiver, the at least one processor configured to: determine that a primary traffic flow is passing through an intersection associated with a traffic light, wherein the determination that the primary traffic flow is passing through the intersection is based on sensor data from one or more sensors of the vehicle, vehicle-to-vehicle (V2V) communication, vehicle-to-everything (V2X) communication, or any combination thereof; and reduce a speed of the vehicle to prevent the vehicle from tripping a traffic light sensor associated with the traffic light until after the primary traffic flow has passed through the intersection.

Clause 19. The OBC of clause 18, wherein the at least one processor configured to determine that the primary traffic flow is passing through the intersection comprises the at least one processor configured to: receive, via the at least one transceiver, at least one notification from at least one vehicle of the primary traffic flow via V2V communication, the notification indicating that the primary traffic flow is passing through the intersection.

Clause 20. The OBC of any of clauses 18 to 19, wherein the at least one processor configured to determine that the primary traffic flow is passing through the intersection comprises the at least one processor configured to: receive, via the at least one transceiver, at least one notification from roadside infrastructure associated with the intersection via V2X communication, the notification indicating that the primary traffic flow is passing through the intersection.

Clause 21. The OBC of clause 20, wherein the at least one notification is relayed from at least one vehicle of the primary traffic flow.

Clause 22. The OBC of any of clauses 18 to 21, wherein the at least one processor configured to determine that the primary traffic flow is passing through the intersection comprises the at least one processor configured to: detect the primary traffic flow based on the sensor data from the one or more sensors of the vehicle. Clause 23. The OBC of any of clauses 18 to 22, wherein the one or more sensors of the vehicle comprise: one or more cameras, radar, lidar, or any combination thereof.

Clause 24. The OBC of any of clauses 18 to 23, wherein the primary traffic flow is determined to be the primary traffic flow based on: a number of vehicles in the primary traffic flow being greater than a threshold, a priority of at least one vehicle in the primary traffic flow being greater than a priority of the vehicle, or any combination thereof.

Clause 25. The OBC of any of clauses 18 to 24, wherein the at least one processor configured to reduce the speed of the vehicle comprises the at least one processor configured to: stop the vehicle before the vehicle reaches the traffic light sensor; or reduce the speed of the vehicle to a reduced speed before the vehicle reaches the traffic light sensor, wherein the reduced speed is selected to prevent the vehicle from stopping and from tripping the traffic light sensor until after the primary traffic flow has passed through the intersection.

Clause 26. The OBC of any of clauses 18 to 25, wherein a location of the traffic light sensor is determined based on: geographic coordinates of the location of the traffic light sensor, a visual indication of the location of the traffic light sensor, map data indicating the location of the traffic light sensor, a database of locations of traffic light sensors, or any combination thereof.

Clause 27. The OBC of clause 26, wherein the visual indication of the location of the traffic light sensor comprises: a marking on a surface of road at the location of the traffic light sensor, a sign at the location of the traffic light sensor, the traffic light sensor, or any combination thereof.

Clause 28. The OBC of any of clauses 18 to 27, wherein the at least one processor is further configured to: determine that the vehicle is a lead vehicle of the secondary traffic flow, wherein the determination that the vehicle is the lead vehicle is based on second sensor data from the one or more sensors of the vehicle, V2V communication with one or more other vehicles of the secondary traffic flow, V2X communication with infrastructure associated with the intersection, or any combination thereof.

Clause 29. The OBC of clause 28, wherein the at least one processor is further configured to: determine that a second vehicle is a second lead vehicle of a different lane of the secondary traffic flow; and coordinate with the second vehicle to reduce a speed of the second vehicle to prevent the second vehicle from tripping the traffic light sensor.

Clause 30. The OBC of clause 29, wherein the at least one processor configured to coordinate with the second vehicle comprises the at least one processor configured to: transmit, via the at least one transceiver, one or more notifications to the second vehicle via V2V signaling; transmit, via the at least one transceiver, the one or more notifications to the second vehicle via roadside infrastructure via V2X signaling; flash lights of the vehicle according to a pattern; or a combination thereof.

Clause 31. The OBC of any of clauses 18 to 30, wherein the at least one processor is further configured to: signal any vehicles behind the vehicle that the vehicle is reducing the speed of the vehicle to prevent the vehicle from tripping the traffic light sensor.

Clause 32. The OBC of clause 31, wherein the at least one processor configured to signal comprises the at least one processor configured to: transmit, via the at least one transceiver, one or more notifications; flash lights of the vehicle according to a pattern; or a combination thereof.

Clause 33. The OBC of any of clauses 18 to 32, wherein the at least one processor is further configured to: receive, via the at least one transceiver, an override command to stop the vehicle from reducing the speed of the vehicle.

Clause 34. The OBC of clause 33, wherein: the override command is received from a driver of the vehicle, or the override command is received based on a determination that the vehicle is a high priority vehicle.

Clause 35. An on-board computer (OBC) of a vehicle of a secondary traffic flow, comprising: means for determining that a primary traffic flow is passing through an intersection associated with a traffic light, wherein the determination that the primary traffic flow is passing through the intersection is based on sensor data from one or more sensors of the vehicle, vehicle-to-vehicle (V2V) communication, vehicle-to-everything (V2X) communication, or any combination thereof; and means for reducing a speed of the vehicle to prevent the vehicle from tripping a traffic light sensor associated with the traffic light until after the primary traffic flow has passed through the intersection.

Clause 36. The OBC of clause 35, wherein the means for determining that the primary traffic flow is passing through the intersection comprises: means for receiving at least one notification from at least one vehicle of the primary traffic flow via V2V communication, the notification indicating that the primary traffic flow is passing through the intersection.

Clause 37. The OBC of any of clauses 35 to 36, wherein the means for determining that the primary traffic flow is passing through the intersection comprises: means for receiving at least one notification from roadside infrastructure associated with the intersection via V2X communication, the notification indicating that the primary traffic flow is passing through the intersection.

Clause 38. The OBC of clause 37, wherein the at least one notification is relayed from at least one vehicle of the primary traffic flow. Clause 39. The OBC of any of clauses 35 to 38, wherein the means for determining that the primary traffic flow is passing through the intersection comprises: means for detecting the primary traffic flow based on the sensor data from the one or more sensors of the vehicle.

Clause 40. The OBC of any of clauses 35 to 39, wherein the one or more sensors of the vehicle comprise: one or more cameras, radar, lidar, or any combination thereof.

Clause 41. The OBC of any of clauses 35 to 40, wherein the primary traffic flow is determined to be the primary traffic flow based on: a number of vehicles in the primary traffic flow being greater than a threshold, a priority of at least one vehicle in the primary traffic flow being greater than a priority of the vehicle, or any combination thereof.

Clause 42. The OBC of any of clauses 35 to 41, wherein the means for reducing the speed of the vehicle comprises: means for stopping the vehicle before the vehicle reaches the traffic light sensor; or means for reducing the speed of the vehicle to a reduced speed before the vehicle reaches the traffic light sensor, wherein the reduced speed is selected to prevent the vehicle from stopping and from tripping the traffic light sensor until after the primary traffic flow has passed through the intersection.

Clause 43. The OBC of any of clauses 35 to 42, wherein a location of the traffic light sensor is determined based on: geographic coordinates of the location of the traffic light sensor, a visual indication of the location of the traffic light sensor, map data indicating the location of the traffic light sensor, a database of locations of traffic light sensors, or any combination thereof.

Clause 44. The OBC of clause 43, wherein the visual indication of the location of the traffic light sensor comprises: a marking on a surface of road at the location of the traffic light sensor, a sign at the location of the traffic light sensor, the traffic light sensor, or any combination thereof.

Clause 45. The OBC of any of clauses 35 to 44, further comprising: means for determining that the vehicle is a lead vehicle of the secondary traffic flow, wherein the determination that the vehicle is the lead vehicle is based on second sensor data from the one or more sensors of the vehicle, V2V communication with one or more other vehicles of the secondary traffic flow, V2X communication with infrastructure associated with the intersection, or any combination thereof.

Clause 46. The OBC of clause 45, further comprising: means for determining that a second vehicle is a second lead vehicle of a different lane of the secondary traffic flow; and means for coordinating with the second vehicle to reduce a speed of the second vehicle to prevent the second vehicle from tripping the traffic light sensor.

Clause 47. The OBC of clause 46, wherein the means for coordinating with the second vehicle comprises: means for transmitting one or more notifications to the second vehicle via V2V signaling; means for transmitting the one or more notifications to the second vehicle via roadside infrastructure via V2X signaling; means for flashing lights of the vehicle according to a pattern; or a combination thereof.

Clause 48. The OBC of any of clauses 35 to 47, further comprising: means for signaling any vehicles behind the vehicle that the vehicle is reducing the speed of the vehicle to prevent the vehicle from tripping the traffic light sensor.

Clause 49. The OBC of clause 48, wherein the means for signaling comprises: means for transmitting one or more notifications; means for flashing lights of the vehicle according to a pattern; or a combination thereof.

Clause 50. The OBC of any of clauses 35 to 49, further comprising: means for receiving an override command to stop the vehicle from reducing the speed of the vehicle.

Clause 51. The OBC of clause 50, wherein: the override command is received from a driver of the vehicle, or the override command is received based on a determination that the vehicle is a high priority vehicle.

Clause 52. A non-transitory computer-readable medium storing computer-executable instructions that, when executed by an on-board computer (OBC) of a vehicle of a secondary traffic flow, cause the OBC to: determine that a primary traffic flow is passing through an intersection associated with a traffic light, wherein the determination that the primary traffic flow is passing through the intersection is based on sensor data from one or more sensors of the vehicle, vehicle-to-vehicle (V2V) communication, vehicle-to-everything (V2X) communication, or any combination thereof; and reduce a speed of the vehicle to prevent the vehicle from tripping a traffic light sensor associated with the traffic light until after the primary traffic flow has passed through the intersection.

Clause 53. The non-transitory computer-readable medium of clause 52, wherein the computer-executable instructions that, when executed by the OBC, cause the OBC to determine that the primary traffic flow is passing through the intersection comprise computer-executable instructions that, when executed by the OBC, cause the OBC to: receive at least one notification from at least one vehicle of the primary traffic flow via V2V communication, the notification indicating that the primary traffic flow is passing through the intersection.

Clause 54. The non-transitory computer-readable medium of any of clauses 52 to 53, wherein the computer-executable instructions that, when executed by the OBC, cause the OBC to determine that the primary traffic flow is passing through the intersection comprise computer-executable instructions that, when executed by the OBC, cause the OBC to: receive at least one notification from roadside infrastructure associated with the intersection via V2X communication, the notification indicating that the primary traffic flow is passing through the intersection.

Clause 55. The non-transitory computer-readable medium of clause 54, wherein the at least one notification is relayed from at least one vehicle of the primary traffic flow.

Clause 56. The non-transitory computer-readable medium of any of clauses 52 to 55, wherein the computer-executable instructions that, when executed by the OBC, cause the OBC to determine that the primary traffic flow is passing through the intersection comprise computer-executable instructions that, when executed by the OBC, cause the OBC to: detect the primary traffic flow based on the sensor data from the one or more sensors of the vehicle.

Clause 57. The non-transitory computer-readable medium of any of clauses 52 to 56, wherein the one or more sensors of the vehicle comprise: one or more cameras, radar, lidar, or any combination thereof.

Clause 58. The non-transitory computer-readable medium of any of clauses 52 to 57, wherein the primary traffic flow is determined to be the primary traffic flow based on: a number of vehicles in the primary traffic flow being greater than a threshold, a priority of at least one vehicle in the primary traffic flow being greater than a priority of the vehicle, or any combination thereof. Clause 59. The non-transitory computer-readable medium of any of clauses 52 to 58, wherein the computer-executable instructions that, when executed by the OBC, cause the OBC to reduce the speed of the vehicle comprise computer-executable instructions that, when executed by the OBC, cause the OBC to: stop the vehicle before the vehicle reaches the traffic light sensor; or reduce the speed of the vehicle to a reduced speed before the vehicle reaches the traffic light sensor, wherein the reduced speed is selected to prevent the vehicle from stopping and from tripping the traffic light sensor until after the primary traffic flow has passed through the intersection.

Clause 60. The non-transitory computer-readable medium of any of clauses 52 to 59, wherein a location of the traffic light sensor is determined based on: geographic coordinates of the location of the traffic light sensor, a visual indication of the location of the traffic light sensor, map data indicating the location of the traffic light sensor, a database of locations of traffic light sensors, or any combination thereof.

Clause 61. The non-transitory computer-readable medium of clause 60, wherein the visual indication of the location of the traffic light sensor comprises: a marking on a surface of road at the location of the traffic light sensor, a sign at the location of the traffic light sensor, the traffic light sensor, or any combination thereof.

Clause 62. The non-transitory computer-readable medium of any of clauses 52 to 61, further comprising computer-executable instructions that, when executed by the OBC, cause the OBC to: determine that the vehicle is a lead vehicle of the secondary traffic flow, wherein the determination that the vehicle is the lead vehicle is based on second sensor data from the one or more sensors of the vehicle, V2V communication with one or more other vehicles of the secondary traffic flow, V2X communication with infrastructure associated with the intersection, or any combination thereof.

Clause 63. The non-transitory computer-readable medium of clause 62, further comprising computer-executable instructions that, when executed by the OBC, cause the OBC to: determine that a second vehicle is a second lead vehicle of a different lane of the secondary traffic flow; and coordinate with the second vehicle to reduce a speed of the second vehicle to prevent the second vehicle from tripping the traffic light sensor.

Clause 64. The non-transitory computer-readable medium of clause 63, wherein the computer-executable instructions that, when executed by the OBC, cause the OBC to coordinate with the second vehicle comprise computer-executable instructions that, when executed by the OBC, cause the OBC to: transmit one or more notifications to the second vehicle via V2V signaling; transmit the one or more notifications to the second vehicle via roadside infrastructure via V2X signaling; flash lights of the vehicle according to a pattern; or a combination thereof.

Clause 65. The non-transitory computer-readable medium of any of clauses 52 to 64, further comprising computer-executable instructions that, when executed by the OBC, cause the OBC to: signal any vehicles behind the vehicle that the vehicle is reducing the speed of the vehicle to prevent the vehicle from tripping the traffic light sensor.

Clause 66. The non-transitory computer-readable medium of clause 65, wherein the computer-executable instructions that, when executed by the OBC, cause the OBC to signal comprise computer-executable instructions that, when executed by the OBC, cause the OBC to: transmit one or more notifications; flash lights of the vehicle according to a pattern; or a combination thereof. Clause 67. The non-transitory computer-readable medium of any of clauses 52 to 66, further comprising computer-executable instructions that, when executed by the OBC, cause the OBC to: receive an override command to stop the vehicle from reducing the speed of the vehicle.

Clause 68. The non-transitory computer-readable medium of clause 67, wherein: the override command is received from a driver of the vehicle, or the override command is received based on a determination that the vehicle is a high priority vehicle.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of traffic flow control performed by an on-board computer (OBC) of a vehicle of a secondary traffic flow, comprising:
   determining that a primary traffic flow is passing through an intersection associated with a traffic light, wherein the determination that the primary traffic flow is passing through the intersection is based on sensor data from one or more sensors of the vehicle, vehicle-to-vehicle (V2V) communication, vehicle-to-everything (V2X) communication, or any combination thereof; and
   reducing a speed of the vehicle to prevent the vehicle from tripping a traffic light sensor associated with the traffic light until after the primary traffic flow has passed through the intersection.

2. The method of claim 1, wherein determining that the primary traffic flow is passing through the intersection comprises:
   receiving at least one notification from at least one vehicle of the primary traffic flow via V2V communication, the notification indicating that the primary traffic flow is passing through the intersection.

3. The method of claim 1, wherein determining that the primary traffic flow is passing through the intersection comprises:
   receiving at least one notification from roadside infrastructure associated with the intersection via V2X communication, the notification indicating that the primary traffic flow is passing through the intersection.

4. The method of claim 3, wherein the at least one notification is relayed from at least one vehicle of the primary traffic flow.

5. The method of claim 1, wherein determining that the primary traffic flow is passing through the intersection comprises:
   detecting the primary traffic flow based on the sensor data from the one or more sensors of the vehicle.

6. The method of claim 1, wherein the one or more sensors of the vehicle comprise:
   one or more cameras,
   radar,
   lidar, or
   any combination thereof.

7. The method of claim 1, wherein the primary traffic flow is determined to be the primary traffic flow based on:
   a number of vehicles in the primary traffic flow being greater than a threshold,
   a priority of at least one vehicle in the primary traffic flow being greater than a priority of the vehicle, or
   any combination thereof.

8. The method of claim 1, wherein reducing the speed of the vehicle comprises:
   stopping the vehicle before the vehicle reaches the traffic light sensor; or
   reducing the speed of the vehicle to a reduced speed before the vehicle reaches the traffic light sensor, wherein the reduced speed is selected to prevent the vehicle from stopping and from tripping the traffic light sensor until after the primary traffic flow has passed through the intersection.

9. The method of claim 1, wherein a location of the traffic light sensor is determined based on:
   geographic coordinates of the location of the traffic light sensor,
   a visual indication of the location of the traffic light sensor,
   map data indicating the location of the traffic light sensor,
   a database of locations of traffic light sensors, or
   any combination thereof.

10. The method of claim 9, wherein the visual indication of the location of the traffic light sensor comprises:
    a marking on a surface of a road at the location of the traffic light sensor,
    a sign at the location of the traffic light sensor,
    the traffic light sensor, or
    any combination thereof.

11. The method of claim 1, further comprising:
    determining that the vehicle is a lead vehicle of the secondary traffic flow, wherein the determination that the vehicle is the lead vehicle is based on second sensor data from the one or more sensors of the vehicle, V2V communication with one or more other vehicles of the secondary traffic flow, V2X communication with infrastructure associated with the intersection, or any combination thereof.

12. The method of claim 11, further comprising:
    determining that a second vehicle is a second lead vehicle of a different lane of the secondary traffic flow; and
    coordinating with the second vehicle to reduce a speed of the second vehicle to prevent the second vehicle from tripping the traffic light sensor.

13. The method of claim 12, wherein coordinating with the second vehicle comprises:
    transmitting one or more notifications to the second vehicle via V2V signaling;
    transmitting the one or more notifications to the second vehicle via roadside infrastructure via V2X signaling;
    flashing lights of the vehicle according to a pattern; or
    a combination thereof.

14. The method of claim 1, further comprising:
    signaling any vehicles behind the vehicle that the vehicle is reducing the speed of the vehicle to prevent the vehicle from tripping the traffic light sensor.

15. The method of claim 14, wherein the signaling comprises:
    transmitting one or more notifications;
    flashing lights of the vehicle according to a pattern; or
    a combination thereof.

16. The method of claim 1, further comprising:
    receiving an override command to stop the vehicle from reducing the speed of the vehicle.

17. The method of claim 16, wherein:
    the override command is received from a driver of the vehicle, or
    the override command is received based on a determination that the vehicle is a high priority vehicle.

18. An on-board computer (OBC) of a vehicle of a secondary traffic flow, comprising:
    a memory;
    at least one transceiver; and
    at least one processor communicatively coupled to the memory and the at least one transceiver, the at least one processor configured to:
        determine that a primary traffic flow is passing through an intersection associated with a traffic light, wherein the determination that the primary traffic flow is passing through the intersection is based on sensor data from one or more sensors of the vehicle, vehicle-to-vehicle (V2V) communication, vehicle-to-everything (V2X) communication, or any combination thereof; and reduce a speed of the vehicle to prevent the vehicle from tripping a traffic light sensor associated with the traffic light until after the primary traffic flow has passed through the intersection.

19. The OBC of claim 18, wherein the at least one processor is further configured to:

signal any vehicles behind the vehicle that the vehicle is reducing the speed of the vehicle to prevent the vehicle from tripping the traffic light sensor.

20. An on-board computer (OBC) of a vehicle of a secondary traffic flow, comprising:

means for determining that a primary traffic flow is passing through an intersection associated with a traffic light, wherein the determination that the primary traffic flow is passing through the intersection is based on sensor data from one or more sensors of the vehicle, vehicle-to-vehicle (V2V) communication, vehicle-to-everything (V2X) communication, or any combination thereof; and means for reducing a speed of the vehicle to prevent the vehicle from tripping a traffic light sensor associated with the traffic light until after the primary traffic flow has passed through the intersection.

* * * * *